Dec. 23, 1941.  T. J. CUNNINGHAM  2,266,852
SCREW CLAMP
Filed Aug. 6, 1941
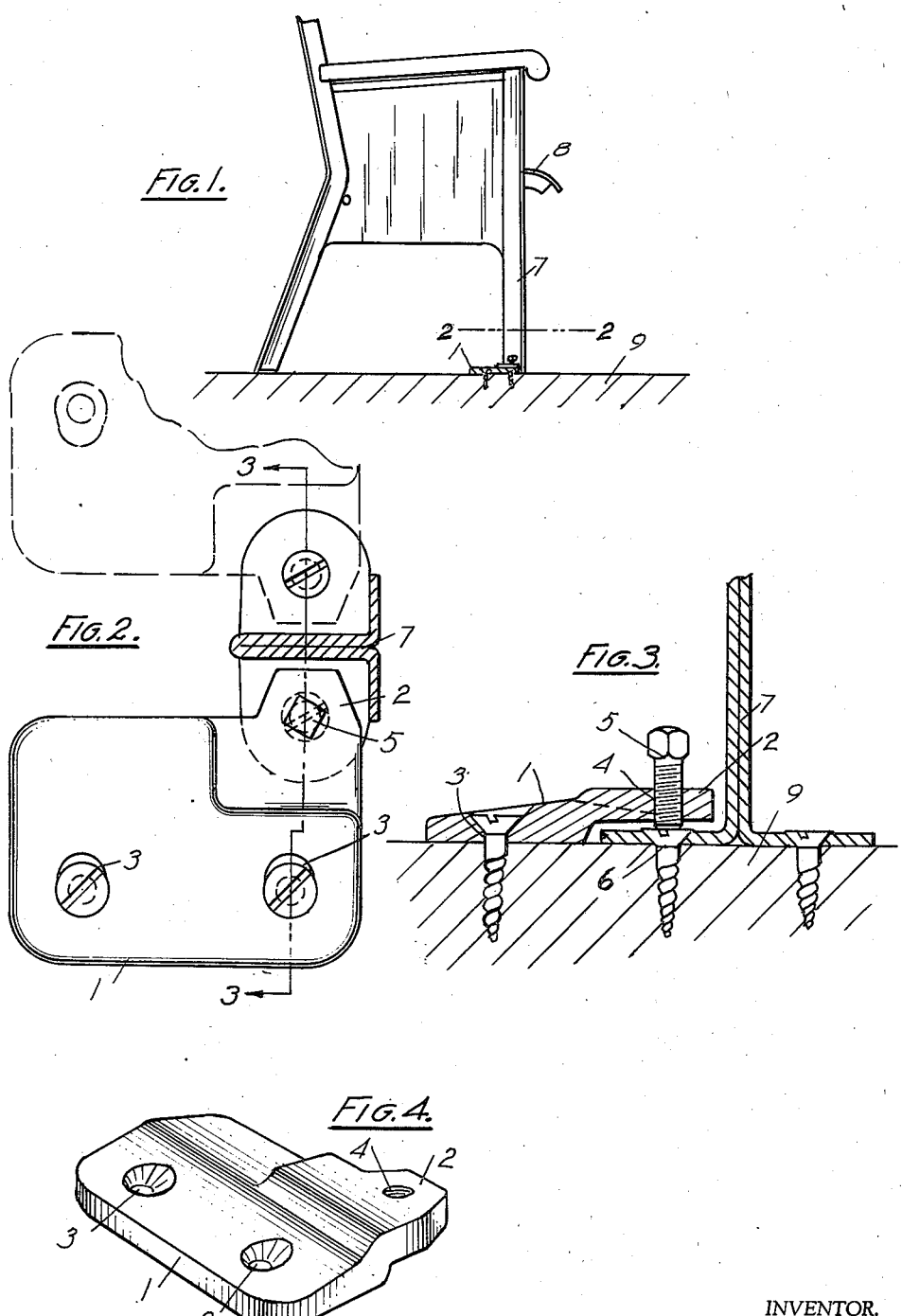
INVENTOR.
TERRANCE J. CUNNINGHAM
BY
Florian G. Miller,
Atty.

Patented Dec. 23, 1941

2,266,852

UNITED STATES PATENT OFFICE 2,266,852

SCREW CLAMP

Terrance J. Cunningham, Erie, Pa.

Application August 6, 1941, Serial No. 405,635

3 Claims. (Cl. 85—1)

This invention relates generally to clamps, more particularly to screw clamps for theater seat legs.

Because of hard usage and heavy forces on the top of the backs of theater seats, the screws securing the legs of the seats are pulled loose. Theater seats are generally placed in particular positions so that it is practicably impossible to remove the seats to a new location in order that the threads of the screws might be utilized for securing the seats. Ordinary clamps have been tried, but they do not remain in place, and they permit lateral movement of the seats because of the looseness of the screw in the hole made by it. Because of the countersunk apertures for the leg screws, conventional clamps have proved impractical for this purpose.

It is accordingly an object of my invention to overcome the above and other difficulties in clamps for seat legs, and it is more particularly an object of my invention to provide a screw clamp which is simple in construction, economical in manufacture, economical in cost and easy to install.

Another object of my invention is to provide a screw clamp which prevents lateral movement of a leg.

Another object of my invention is to provide a screw clamp for a leg which has simple means for increasing or decreasing the force on the screws holding the legs.

Another object of my invention is to provide a screw clamp for a screw securing a leg to a floor which forces the screw into a countersunk hole and into the hole made by it in the floor.

Other objects of my invention will become evident from the following detailed description taken in conjunction with the accompanying drawing, in which:

Fig. 1 is the side elevational view of a seat with my novel screw clamp positioned to secure the leg of the seat to the floor.

Fig. 2 is a view on the line 2—2 of Fig. 1.

Fig. 3 is a view taken on the line 3—3 of Fig. 2.

Fig. 4 is a perspective view of my novel screw clamp.

Referring now to the drawing, Figs. 1, 2 and 3 show a plate member 1 having an upwardly and outwardly extending portion 2 and countersunk screw holes 3 for receiving screws for securing the plate member 1 to a floor 9. The outwardly projecting portion 2 has a threaded aperture 4 for receiving a screw bolt 5. The screw bolt 5 is disposed in alignment with screw 6 formerly used to secure the leg 7 of the seat 8 to the floor 9.

In operation, plate member 1 is disposed in a position adjacent the leg 7 of the seat 8 to be secured to the floor 9, and the threaded aperture 4 in the outwardly extending portion 2 is disposed in vertical alignment with the screw 6 formerly used to secure the leg 7 to the floor 9. The plate member 1 is then secured to the floor 9 by screws 10. The screw bolt 5 is then turned in the threaded aperture 4 to engage the head of the screw 6 and force it downwardly into the hole made by it in the floor. By forcing the screw 6 downwardly, the leg 7 is held firmly on the floor 9 and the screw 6 is forced into the hole made by it to prevent lateral movement of the leg.

My novel clamp is so constructed that no projection extends therefrom thereby minimizing the possibility of tripping thereover. It is especially efficient in forcing loose screws set in countersunk apertures into the countersunk portion of the aperture and into the hole made by it in a floor.

It will be evident that I have provided a clamp which is easy to install and which prevents any movement of the leg of a seat laterally or otherwise.

Various changes may be made in the specific embodiment of my invention without departing from the spirit thereof or from the scope of the appended claims.

What I claim is:

1. A screw clamp for loose screws comprising a plate member having an upwardly and outwardly extending portion, a screw member in said offset portion for engagement with the top of said loose screw and means for securing said plate member to the attaching surface.

2. A screw clamp for loose floor screws securing a leg to a floor comprising a plate member, means for securing said member to a floor, an offset portion on said member having the underside thereof spaced a predetermined distance from the floor and having a threaded aperture therein, and a screw member engaging said aperture for engaging the top of said loose floor screw.

3. A screw clamp for loose floor screws securing the leg of a seat disposed in countersunk portions of the base of a seat, comprising a plate having an upwardly and outwardly extending portion for passing over said base of said seat, a screw member in said outwardly extending portion for engaging the top of a loose floor screw and means for securing said plate to said floor.

TERRANCE J. CUNNINGHAM.